US009719731B1

(12) United States Patent
Bruns et al.

(10) Patent No.: US 9,719,731 B1
(45) Date of Patent: Aug. 1, 2017

(54) CHAINED HEAT PIPES FOR THERMAL CONTROL

(71) Applicant: X Development LLC, Mountain View, CA (US)

(72) Inventors: Richard Chad Bruns, Mountain View, CA (US); Kyle Brookes, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 579 days.

(21) Appl. No.: 14/484,955

(22) Filed: Sep. 12, 2014

(51) Int. Cl.
*F28D 15/00* (2006.01)
*F28D 15/02* (2006.01)
*F28F 1/12* (2006.01)

(52) U.S. Cl.
CPC ............... *F28D 15/02* (2013.01); *F28F 1/12* (2013.01)

(58) Field of Classification Search
CPC .. F28D 15/02; F28D 15/0266; F28D 15/0233; F28D 15/025; F28F 1/12
USPC ........................ 165/104.21, 104.26
See application file for complete search history.

(56) References Cited

U.S. PATENT DOCUMENTS

| 6,424,528 B1* | 7/2002 | Chao ................. H01L 23/427 165/104.33 |
| 2010/0223942 A1 | 9/2010 | Merino et al. |
| 2010/0326627 A1* | 12/2010 | Schon ............... H05K 7/20309 165/104.21 |
| 2012/0031119 A1* | 2/2012 | Ahmad ................. B64B 1/50 62/79 |

FOREIGN PATENT DOCUMENTS

| JP | 59001994 A | 2/2011 |
| KR | 20110014856 A | 2/2011 |

* cited by examiner

Primary Examiner — Davis Hwu
(74) Attorney, Agent, or Firm — Lerner, David, Littenberg, Krumholz & Mentlik, LLP

(57) ABSTRACT

The present disclosure provides a thermal control apparatus for controlling temperatures in a payload of a balloon. The thermal control apparatus includes a plurality of heat pipes. A first heat pipe from the plurality of heat pipes has a first end and a second end and contains working fluid. A heat source is in thermal communication with the first heat pipe. The heat source is configured to heat the working fluid in the first heat pipe. A second heat pipe from the plurality of heat pipes contains working fluid and a portion of the second heat pipe is positioned a predetermined distance from the first heat pipe. The predetermined distance allows for a heat exchange from the first heat pipe to the second heat pipe. This heat exchange includes heat drawn away from the heat source.

20 Claims, 6 Drawing Sheets

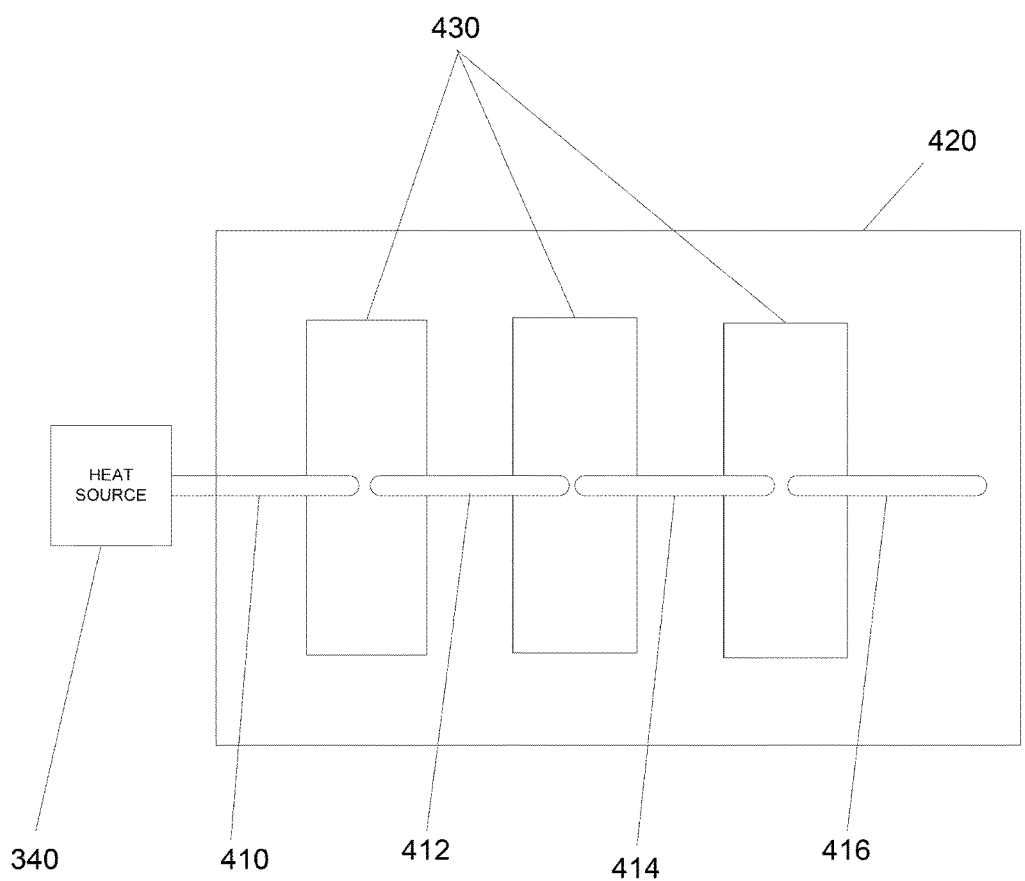

NON-WORKING MODE

WORKING MODE

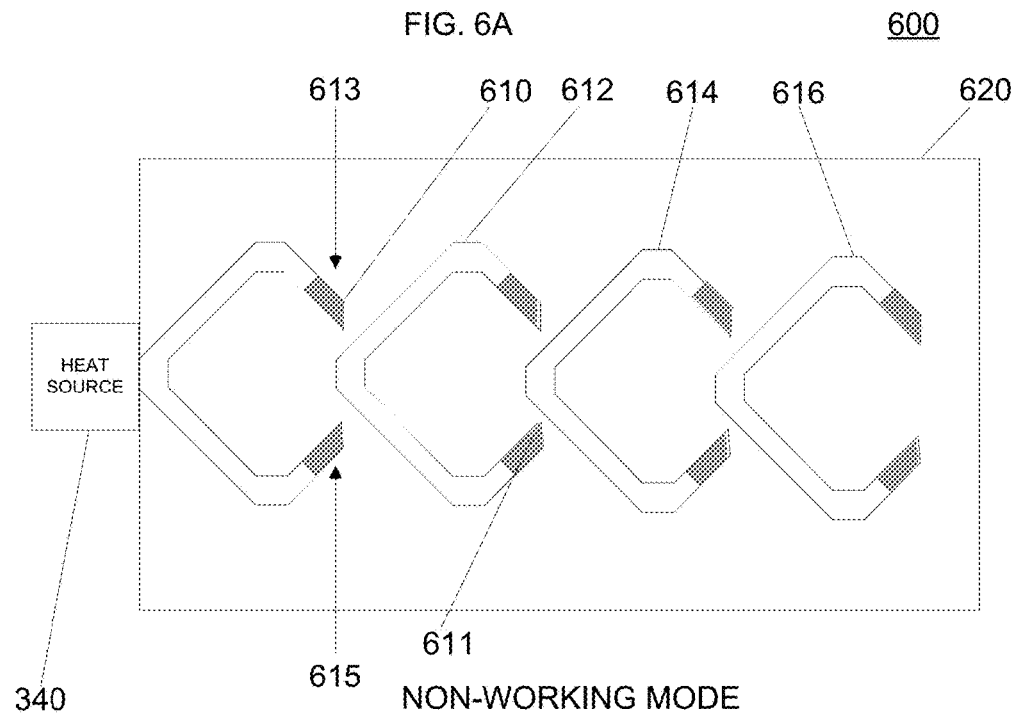
FIG. 6A — NON-WORKING MODE
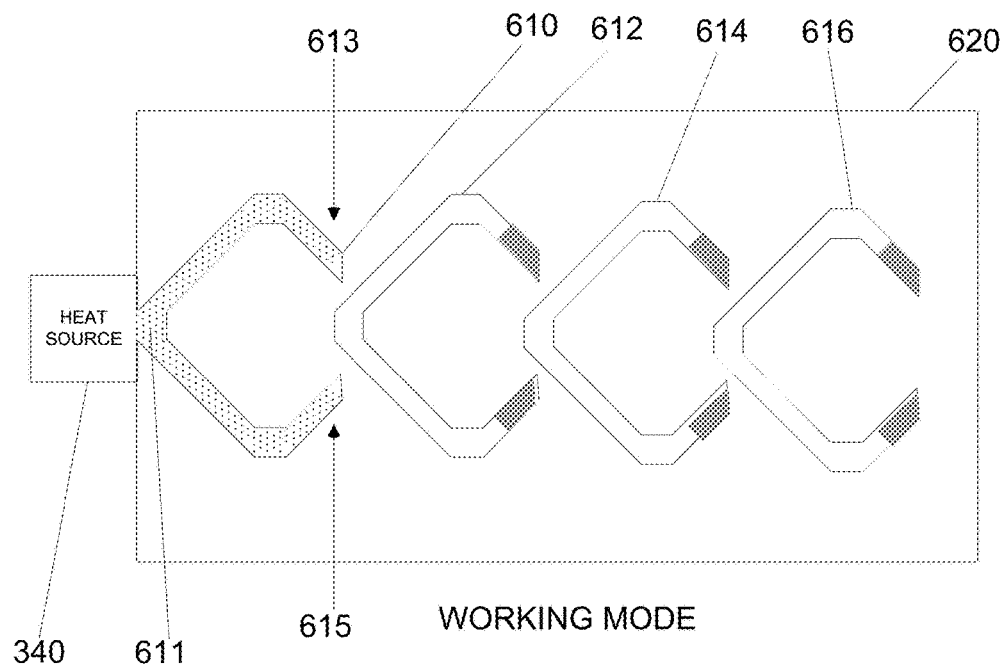
FIG. 6B — WORKING MODE

CHAINED HEAT PIPES FOR THERMAL CONTROL

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some communication systems may provide network access via a balloon network operating in the stratosphere. During normal operations, balloons of the balloon network may need to operate under various extreme conditions that can affect electronic components of the balloons. For example, the balloons of the network may reach altitudes where they may experience severe temperature cycles and extreme temperatures due to the rotation of the Earth. At the same time, during operation, the electronic components of the balloons, such as those used to provide connectivity, may produce heat.

In some situations, a heat pipe in which working fluid condenses and evaporates may be used to channel heat away from the electronic components and reduce operating temperatures of the components. However, given the extreme temperatures experienced in the stratosphere, the heat pipes may also be subject to freezing. In this regard, "waking up" or thawing a frozen heat pipe may be difficult because the working fluid in the heat pipe may freeze at an extreme end of the pipe. In such cases, the electronic components of the balloons may overheat and even become damaged before the heat pipe has a chance to thaw.

BRIEF SUMMARY

Aspects of the present disclosure are advantageous for providing a system comprising a balloon having a balloon envelope where the balloon is coupled to a payload and a thermal control apparatus having a plurality of heat pipes for use with the payload. The thermal control apparatus includes a first heat pipe from the plurality of heat pipes, a heat source associated with the payload and in thermal communication with the first heat pipe and a second heat pipe from the plurality of heat pipes containing working fluid. The first heat pipe includes a first end and a second end and contains working fluid therein. The heat source may be configured to heat the working fluid in the first heat pipe. At least a portion of the second heat pipe is positioned a predetermined distance from a section of the first heat pipe. The predetermined distance is configured to allow for a heat exchange from the first heat pipe to the second heat pipe. This heat exchange includes heat drawn away from the heat source.

In one example, the heat exchange from the first heat pipe to the second heat pipe is configured to heat the working fluid in the second heat pipe. In this regard, the heat exchange is further configured to cause a phase change of the working fluid in the second heat pipe.

In another example, the thermal control apparatus includes heat exchange material attached to the first heat pipe and the second heat pipe. The heat exchange material may be configured to transfer heat from the first heat pipe to the second heat pipe.

In yet another example, each heat pipe of the plurality of heat pipes is curve shaped, where the first and second ends of the first heat pipe are arranged towards the second heat pipe. In this regard, the first and second ends of the first heat pipe are configured to transmit heat to the second heat pipe.

In another embodiment, a thermal control apparatus having a plurality of heat pipes is provided. The thermal control apparatus includes a first heat pipe from the plurality of heat pipes having a first end and a second end and containing working fluid, a heat source in thermal communication with the first heat pipe and a second heat pipe from the plurality of heat pipes containing working fluid. The heat source may be configured to heat the working fluid in the first heat pipe. At least a portion of the second heat pipe is positioned a predetermined distance from a section of the first heat pipe. The predetermined distance is configured to allow for a heat exchange from the first heat pipe to the second heat pipe. This heat exchange includes heat drawn away from the heat source.

BRIEF DESCRIPTION OF THE DRAWINGS

FIG. 4 is another example of an apparatus in accordance with aspects of the present disclosure.

FIGS. 6A-6B are yet another example of an apparatus in accordance with aspects of the present disclosure.

DETAILED DESCRIPTION

The present disclosure generally relates to providing techniques for handling extreme temperature changes experienced by high-altitude balloons. In one embodiment, a thermal control apparatus for such a balloon may include a plurality of heat pipes arranged adjacent to each other and a heat source coupled to at least one of the heat pipes. Each heat pipe can include a hollow tube portion that has a type of working fluid (e.g., water) enclosed therein. The working fluid in a given heat pipe of the plurality of heat pipes may be used in a heat exchange for transferring heat to any heat pipes that are adjacent to the given heat pipe. In some embodiments, the heat pipes may be spaced apart an effective distance to facilitate the heat exchange to any adjacent heat pipe.

A heat source may activate heat exchanges between the heat pipes of the plurality of heat pipes. For example, the heat source may be any type of heat source, such as electronic component, that under the extreme temperature conditions can become hot enough to vaporize the working fluid. When activated, the heat source may heat the working fluid enclosed in a heat pipe of the plurality of heat pipes that is attached to the heat source. This heating may cause a heat exchange with an adjacent heat pipe. This, in turn, may cause a heat exchange with another adjacent heat pipe and so one with each adjacent heat pipe of the plurality of heat pipes.

In some embodiments, to help facilitate the heat exchange between adjacent heat pipes, the thermal control apparatus may include heat exchange material. The heat exchange change material may be attached to portions of two adjacent heat pipes of the plurality of heat pipes.

Each heat pipe may also have a curve shaped or bent. For example, the heat pipes may be "C-shaped", "U-shaped" or other types of similar shapes that may help facilitate the spreading of heat during the heat exchange from one heat pipe of the plurality of heat pipes to an adjacent heat pipe of the plurality of heat pipes.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

EXAMPLE SYSTEM

Figure 1:
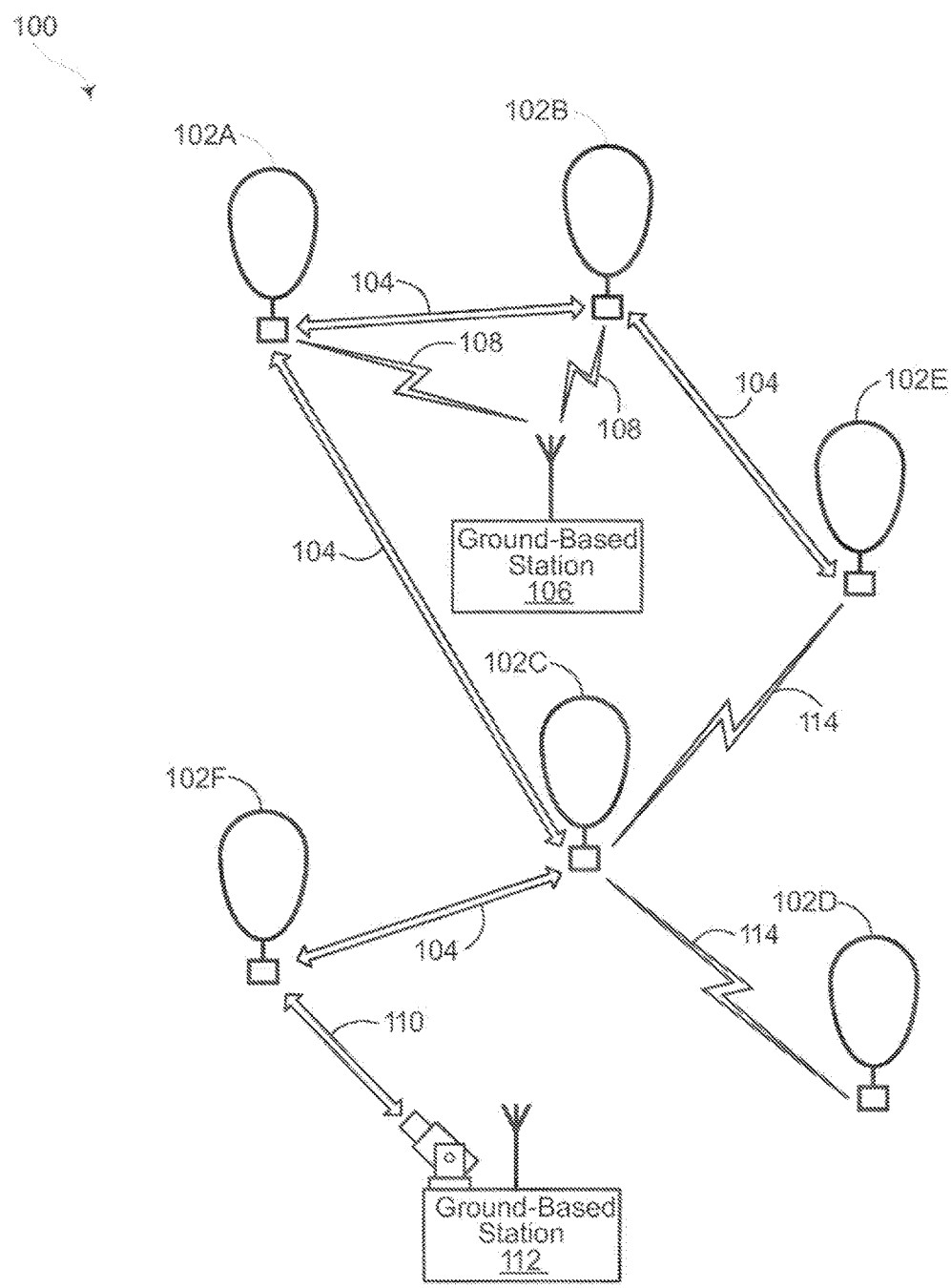
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features of the present disclosure. For example, the features and techniques described herein can be used with other types of systems, such as satellites or terrestrial cryogenic systems, which may operate in various environments where temperatures can get significantly below the freezing point of water and/or use other types of devices (e.g., spacecrafts or drones). In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

EXAMPLE BALLOON

Figure 2:
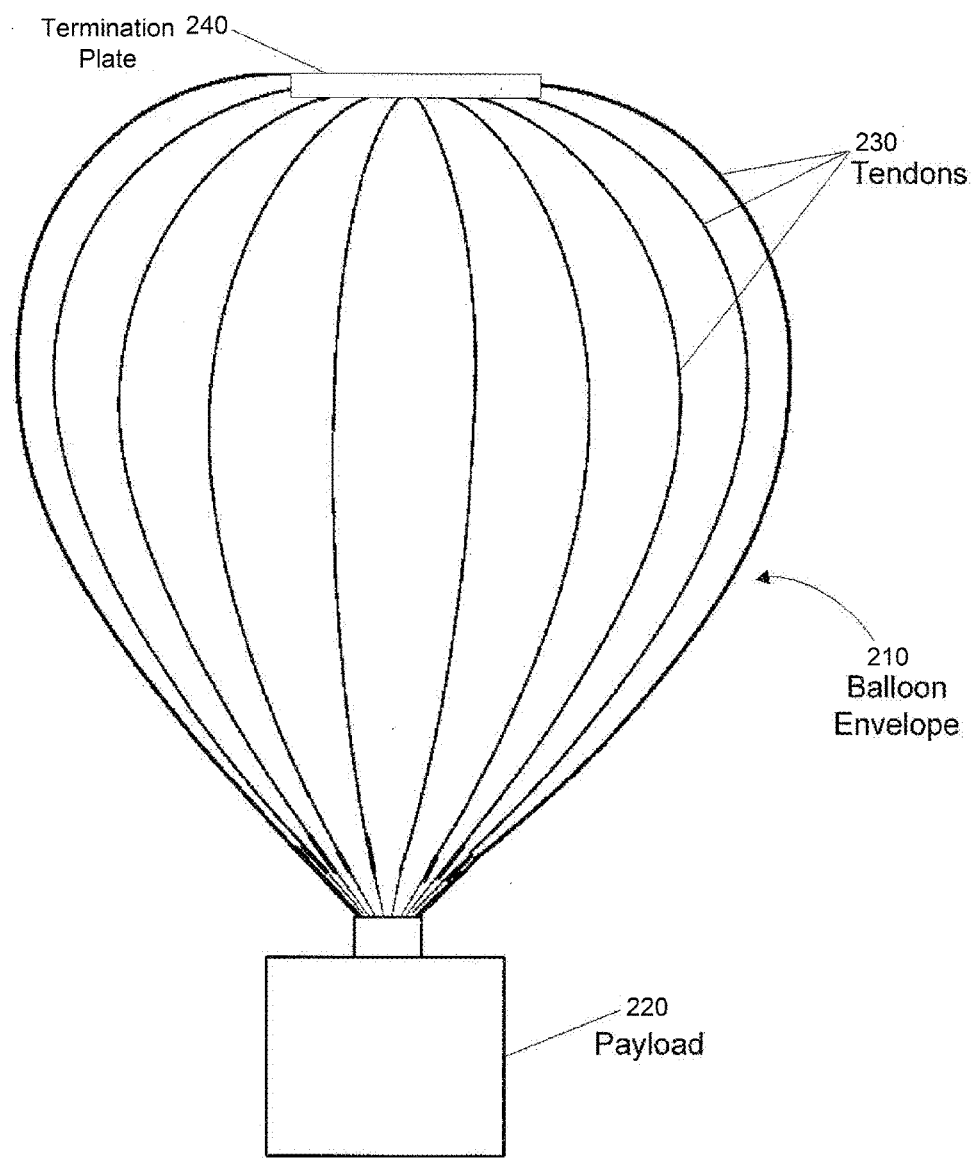
FIG. 2 is an example of a balloon in accordance with aspects of the present disclosure.

FIG. 2 is an example balloon 200, which may represent any of the balloons of balloon network 100. As shown, the balloon 200 includes a balloon envelope 210, a payload 220 and a plurality of tendons 230 attached to the envelope 210 and a termination plate 240.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. Additionally, or alternatively, some or all of envelope 210 may be constructed from a highly flexible latex material or rubber material such as chloroprene. Other materials or combinations thereof may also be employed. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

Pressurized lift gas within the balloon envelope 210 may cause a force or load to be applied to the balloon 200. In that regard, the tendons 230 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a type of sleeve or tubing may be adhered to the respective envelopes with the tendon positioned therein. In some examples, the tendons 230 may be run from the apex to the bottom of the balloon envelope 210 in order to pick up the load.

Top ends of the tendons 230 may be coupled together using a type of apparatus, such as termination plate 240, which may be positioned at the apex of balloon envelope 210. In some examples, bottom ends of the tendons 230 may also be connected to one another. For example, a corresponding plate (not shown) may be disposed at a base or bottom of the balloon envelope 210. In some examples, the termination plate 240 at the apex may be the same size and shape as the plate at the bottom of the envelope 210. Both plates may include corresponding components for attaching the tendons 230 thereto.

Payload 220 of balloon 200 is affixed to the envelope by a connection such as a cable (not shown). The payload 220 may include electronic components such as a computer system (not shown), having one or more processors and on-board data storage (e.g., memory). The payload 220 may also include other types of electronic components such as various equipment and systems (not shown). For example, the payload 220 may include an optical communication system, a navigation system, a positioning system, a lighting system, an altitude control system and a power supply to supply power to various components of balloon 200.

During normal operations, the balloon 200 may float in the stratosphere with other balloons as part of the balloon network providing network access or data connectivity via the operations of the payloads of these balloons. As noted above, the electronic components of payload 220 may be exposed to extreme temperature shifts as well as produce heat during operation. In order to dissipate or displace the heat away from the payload 220, a thermal control apparatus may be used to passively transfer heat from inside and/or outside of the payload 220 to a plurality of short length heat pipes through a rapid series of heat exchange.

Figure 3:
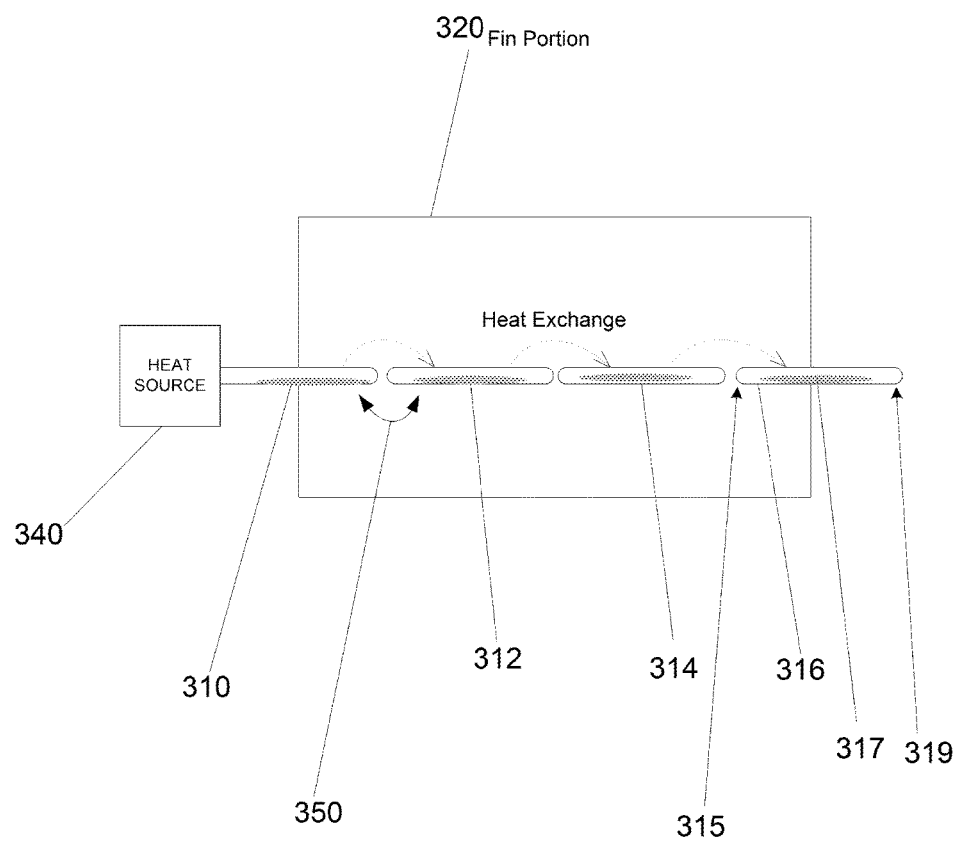
FIG. 3 is an example of an apparatus in accordance with aspects of the present disclosure.

FIG. 3 depicts example of an apparatus 300, for example, a thermal control apparatus for use with a payload, such as payload 220. As shown, the apparatus 300 includes a plurality of heat pipes, such as heat pipes 310, 312, 314 and 316, for transferring heat away from heat source 340 and a fin portion 320 for displacing the heat transferred to the heat pipes 310, 312, 314 and 316, for example, through convection and/or radiation. The heat pipes 310, 312, 314 and 316 may be coupled to the fin portion 320, for example, by using solder or a type epoxy to attach the pipes to a surface of the fin portion 320.

In some embodiments, at least one heat pipe from the plurality of heat pipes may be in thermal communication with a heat source. For example, in FIG. 3, heat pipe 310 is shown coupled to the heat source 340 in such manner that the emitted heat can be transferred to the pipe. This heat source 340 may include, for example, one or more electronic components of the payload 220 that produces heat during operation.

To couple the heat source 340 to a heat pipe, such as heat pipe 310, a portion of the heat pipe 310 may include a base (not shown) that may be arranged over a top surface of the heat source 340. For example, the base may be coupled to one end of the heat pipe 310 and may be used to direct heat from the heat source 340 to the heat pipe. Alternatively, the heat source 340 may not be directly coupled to the heat pipe 310, but rather may be arranged substantially near the heat pipe 310 such that the heat pipe 310 can conduct heat from the heat source 340.

Each heat pipe of the plurality of heat pipes may be made of a rigid yet lightweight material, such as copper, aluminum, titanium, Inconel alloys or other materials of similar or different properties. Within this material, each heat pipe may include a hollow tube portion or cavity for holding working fluid. For example in FIG. 3, heat pipe 316 is shown having a first end 315 and a second end 319 with working fluid 317 contained in a hollow tube portion (not shown) there between. Each of the heat pipes 310, 312, and 314 may also include first and second ends with a hollow tube portions for holding working fluid in between.

These hollow tube portions may extend from the first and second ends of the heat pipes. Because of this, the first and second ends of an individual heat pipe, such as first and second ends 315 and 319 of heat pipe 316, may be sealed so that the working fluid 317 stays within the pipe. In some embodiments, the hollow tube portion may be configured to release thermal energy (e.g., heat) generated from the working fluid. For example, the hollow tube portion may include a wick (not shown) that may be configured to absorb and release heat generated when the working fluid changes phase or evaporates to a vapor and subsequently condenses back to a fluid.

The working fluid in each heat pipe may be a type of liquid that can be heated to a vapor, such as water, methanol or ammonia. The working fluid can be used in a heat exchange for transmitting heat throughout a given heat pipe and subsequently transfer that heat to an adjacent heat pipe of the plurality of heat pipes. One advantage to this arrangement of heat pipes as disclosed herein is that it enables for a wider selection of working fluids for the pipes. Although different types of liquids can be used as the working fluid, water may provide superior thermal performance as compared to other types of liquids and may work better against gravity due to water's higher surface tension. In addition, water may be less dangerous to use, store and ship.

The heat pipes may be spaced apart an effective distance to facilitate the heat exchange operations of apparatus 300. For example, heat pipe 310 is shown spaced a certain effective distance 350 from heat pipe 312. The effective distance 350 may be configured so that heat pipe 310 may be able to transfer heat to the adjacent heat pipe 312. This effective distance may vary considerably depending on the configuration or arrangement of the heat pipes 310, 312, 314 and 316. For example, the effective distance can include a negative distance where a portion of the heat pipes may overlap with each other, or in some embodiments, the effective distance can vary in length from a given heat pipe to another heat pipe in the plurality of heat pipes.

The fin 320 may be made of a rigid material, such as an aluminum alloy, or other types of materials that have relatively high thermal conductivity properties. In some embodiments, the fin 320 may be arranged so that so that it is in thermal communication with the heat pipes. For example, the fin 320 may be arranged so that heat emanating from at least one of the heat pipes may reach the fin 320. Heat flowing in at one end of the fin 320 may be dissipated as it travels to the other end of the fin 320. For example, the fin 320 may be arranged such that airflow through the fin 320 may dissipate the heat emanating from the heat pipes away from the heat source 340.

Each heat pipe of the plurality of heat pipes may be of a certain length and arranged such that a given heat pipe is positioned adjacent to at least one other heat pipe. By way of example only, in FIG. 3, heat pipes 310, 312, 314 and 316 are shown arranged in a daisy chain lengthwise from end-to-end without having any heat pipes intersecting with or contacting one another. Such an arrangement may allow for a longer series of heat pipes, which may lead to less heat leakage or loss.

Activation of the apparatus 300 may be initiated when the heat source 340 starts to heat up. For example, the heat source 340 may increase in temperature as a result of normal operation. As the heat source 340 starts to heat up, some of the heat may move down the first heat pipe 310 due to thermal conduction. When the end of the heat pipe 310 opposite the heat source 340 reaches a certain temperature threshold (e.g., the melting point of the working fluid), the pipe may begin to "wake up" or otherwise defrost. This in turn may cause frozen working fluid at the end of the heat pipe 310 to melt so that the pipe may function as a heat pipe, with an effectively much higher thermal conductivity.

Once heat pipe 310 defrosts, heat drawn away from the heat source 340 may be then transferred to the next adjacent heat pipe, for example, heat pipe 312. As noted above, the effective distance 350 of adjacent heat pipe 312 to heat pipe 310 allows heat from heat pipe 310 to melt frozen working fluid in heat pipe 312. This heat exchange may continue as the working fluid disposed in each pipe is heated and condensed back into a liquid, thus drawing more and more heat away from the heat source 340.

Although all of the heat pipes 310, 312, 314 and 316 may draw heat from one another in sequence, the apparatus 300 may start working to draw heat away from the heat source 340 when only a portion of the heat pipes of the plurality of heat pipes are involved in the heat exchange. For example, when heat pipe 310 is heated to a point where the working fluid disposed therein is vaporized, the fin 320 may start displacing the heat emitted from heat pipe 310. This may occur even though the other heat pipes 312, 314 and 316 are still in the process of melting the working fluid contained in each pipe. Thus, heat being drawn away from the heat source may only need to travel a short distance, for example, a length of one heat pipe of the plurality heat pipes, before the heat can be dissipated away from the heat source. In general, this may take a shorter amount of time than that required to wake up (e.g., heat) the entire length of heat pipes of the plurality of heat pipes apparatus 300. In addition, for heat loads lower than a maximum and/or environmental conditions cooler than expected, or at night instead of during the day (e.g., when there is no sun), it may be necessary to only defrost some of the heat pipes to reach a good steady-state temperature for the apparatus 300.

FIG. 4 is another example of an apparatus 400 (which may be compared to apparatus 300). As shown, the apparatus 400 includes a plurality of heat pipes, such as heat pipes 410, 412, 414 and 416, coupled to a fin 420 and at least one heat pipe of the plurality heat pipes, here heat pipe 410, coupled to heat source 340. In this example, apparatus 400 also includes a thermal mass, such as heat exchange material 430, attached to a portion of each heat pipe of the plurality of heat pipes. In some embodiments, the heat exchange material 430 may connect one portion of a given heat pipe to a portion of an adjacent heat pipe. For example, as shown in FIG. 4, the heat exchange material 430 may be arranged to connect a portion of heat pipe 410 to a portion of adjacent heat pipe 412 and another portion of heat pipe 412 to a portion of adjacent heat pipe 414 and another portion of heat pipe 414 to a portion of adjacent heat pipe 416.

The heat exchange material 430 may be made of a heat conductive type of material, such as aluminum or any other type of heat conductive material. This heat exchange material 430 may help to facilitate the heat exchange between two heat pipes. For example, the heat exchange material 430 acts to effectively transfer heat from the working fluid in one heat pipe to the exchange fluid in an adjacent pipe.

The apparatus 400 may be configured to operate in at least two operational modes. For example, the apparatus 400 in working mode may operate where heat is being dissipated away from the heat source 340, and in a non-working mode where heat is not being dissipated, such as at night during a diurnal cycle or when the payload 220 electronic are off. This operation may be automatic in that the heat source 340 may automatically heat up the heat pipes to a certain temperature to vaporize the exchange fluid disposed therein during normal operations and/or due to ambient environmental heat that may make the heat source hotter than normal. In some embodiments, when the heat pipes are in a non-working mode the working fluid disposed within the pipes may be frozen. An advantage of using heat pipes in apparatus 400 that can freeze is that the system may dump out less power than otherwise. For example, if the electronics are off it may be necessary for the system to burn power just to keep warm, and if the heat pipes are working even more power may be needed. Thus, when the heat pipes freeze this is a way of insulating when they are not needed.

Figure 5A:
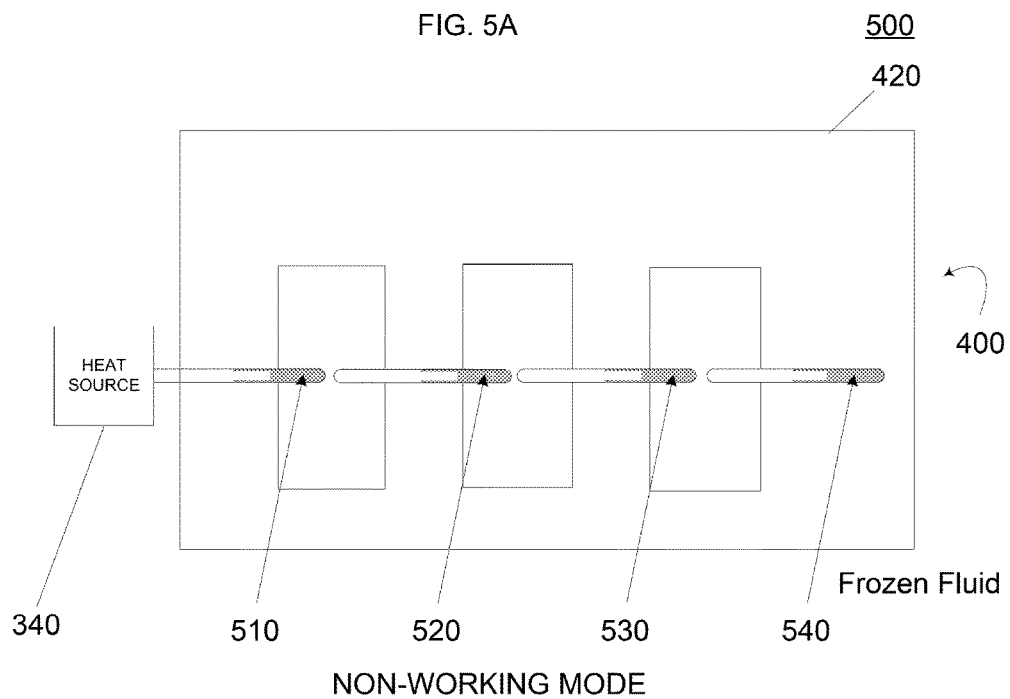
FIGS. 5A-5B are example operational states of the apparatus of FIG. 4 in accordance with aspects of the present disclosure.
Figure 5B:
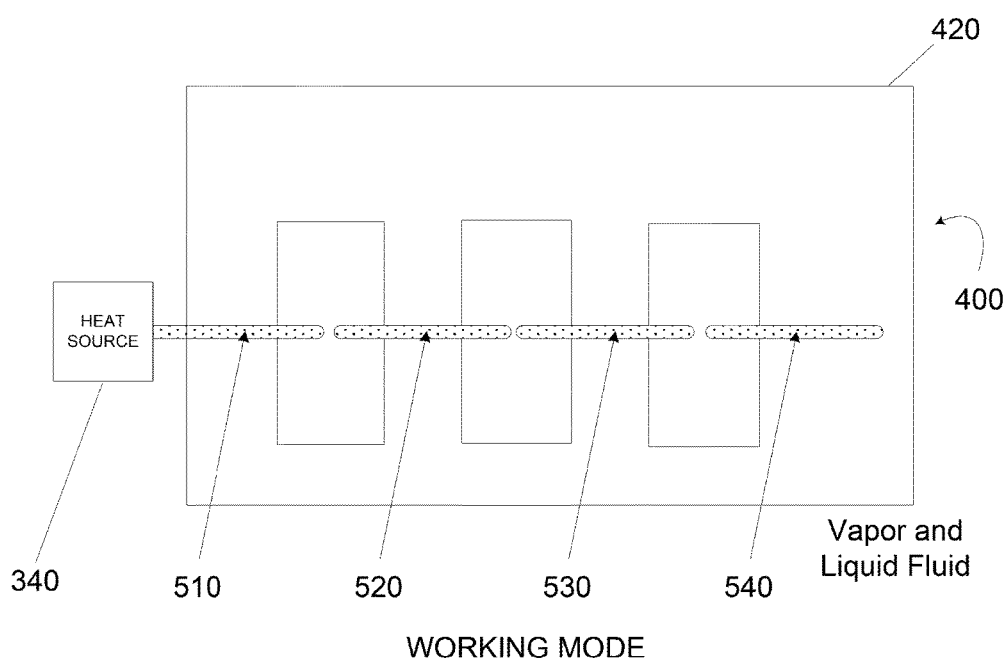

FIGS. 5A-5B operational states 500 of the apparatus 400 of FIG. 4. With respect to FIG. 5A, apparatus 400 is shown in a non-working mode. For example, working fluid 510, 520, 530 and 540 respectively disposed in each heat pipe, and corresponding to the working fluid of apparatus 300 described above, may be in a frozen state. In the non-working mode, the heat pipes are now just ordinary conducting tubes which will be dumping off far less heat than they would be otherwise.

In FIG. 5B, the apparatus 400 is shown in a working mode. For example, the working fluid 510, 520, 530 and 540 respectively disposed in each heat pipe changes into some combination of a vapor and liquid fluid. Each heat pipe starting from heat pipe 410 connected to the heat source 340 may be heat in successive order thawing or activating all of the pipes. As noted above, the apparatus 400 may be automatically activated when the heat source begin to heat up beyond a certain temperature threshold that can vaporize the working fluid 510, 520, 530 and 540. An advantage of the automatic activation features of the apparatus 400 is that the apparatus can become self-regulating when extra heat needs to be dissipated away from the heat source 340. This may eliminate the need of having extra sensors or remote control activation mechanisms that can add extra weight and bulk to the payload 220. In addition, this may help avoid the need for additional software, control algorithms, and moving parts and can be made far cheaper than other types of heat switch devices by being built from components which are much more commonly available.

In some embodiments, each heat pipe of a plurality of heat pipes may be curve shaped such that both a first end and a second end of a given heat pipe are positioned towards a portion of a second heat pipe of the plurality of heat pipes 610. The curve shaped heat pipes may help facilitate the spreading of heat to more portions of the apparatus 400 during the heat exchange from one pipe to another.

FIGS. 6A-6B are views of yet another example of an apparatus 600 including a plurality of heat pipes 610, 612, 614 and 616, where each heat pipe is curve shaped as described above. The apparatus 600 may be compared to apparatus 300 of FIG. 3 and apparatus 400 of FIG. 4. For example, the plurality of heat pipes, such as heat pipes 610, 612, 614 and 616 are coupled to a fin 620 and at least one heat pipe of the plurality heat pipes, here heat pipe 610, is coupled to heat source 340. As noted above, each heat pipe may be of a certain length and arranged such that a given heat pipe is positioned adjacent to at least one other heat pipe. By way of example only, in FIG. 6, heat pipes 610, 612, 614 and 616 are shown arranged in a daisy chain without having any heat pipes intersecting with or contacting one another.

Heat pipes 610, 612, 614 and 616 may be compared to heat pipes 310, 312, 314, and 316 of FIG. 3 and heats pipes 410, 412, 414, and 416 of FIG. 4 in that each heat pipe includes a first end and a second end, such as first end 613 and second end 615 of heat pipe 610, with a hollow tub portion holding working fluid in between. Here, the first and second ends 613 and 615, respectively, of heat pipe 610 are positioned towards a portion of heat pipe 612. As shown, this arrangement of heat pipes may continue alone the daisy chain of heat pipes.

With regard to FIG. 6A, the apparatus 600 is shown in a non-working mode. In this mode, working fluid 611 may be frozen. As discussed above, in the non-working mode, the heat pipes are now just ordinary conducting tubes dumping off a lesser amount of heat. Turning to FIG. 6B, the apparatus 600 is shown in a working mode. For example, as the heat source 340 heats up, heat pipe 610 may begin to thaw such that working fluid 611 in heat pipe 610 may melt into some combination of a vapor and liquid form. As noted above, the curve shape of the heat pipe 610 may help transfer heat from heat pipe 610 to heat pipe 612. For example, heat may be transferred from heat pipe 610 to heat pipe 612 through both the first and second ends 613 and 615 of heat pipe 610. Thus, the curve shape of the heat pipe 610 effectively creates two shorter heat pipes, which is more efficient in terms of the total amount of heat that can be moved due to a shorter capillary effect.

While the examples above discuss using multiple heat pipes, other modifications are possible while still maintaining functionality of the thermal control apparatus described above. In one alternative embodiment, a single long heat pipe may be configured to emulate a plurality of heat pipes. For example, the long heat pipe may be crushed in several spots so as to divide the pipe into segments. In this configuration, care should be taken to ensure that there is an appropriate amount of working fluid in each segment of the long heat pipe in order to facilitate the heat exchange operations of the thermal control apparatus. In another alternative embodiment, overlapping heat pipes or multiple pipes of different lengths from the same source may be used. For example, two heat pipes of different lengths may originate from the same heat source so that one thaws first, then helps to defrost the second one while providing some place for the electronics (e.g., heat source) to dump heat in the meantime.

The above-described aspects of the present disclosure may be advantageous for providing a lightweight self-contained and self-regulating system for controlling temperatures in a payload during extreme ambient temperature shifts. Moreover, by using multiple relatively short heat pipes in place of a single longer heat pipe in the thermal control apparatus as described above, the multiple short heat pipes may have less liquid pressure drop due to wicking and may carry more heat than an equivalent length of the one long heat pipe.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
 a balloon having a balloon envelope, the balloon being coupled to a payload; and
 a thermal control apparatus for use with the payload having a plurality of heat pipes, the thermal control apparatus comprising:
  a first heat pipe from the plurality of heat pipes having a first closed end and a second closed end and containing a first working fluid enclosed within the first heat pipe;
  a heat source associated with the payload and in thermal communication with the first heat pipe, the heat source being configured to externally heat the first working fluid within the first heat pipe; and
  a second heat pipe from the plurality of heat pipes containing a second working fluid enclosed within the second heat pipe and at least a portion of the second heat pipe is positioned a predetermined distance from a section of the first heat pipe, the predetermined distance is configured to allow for a heat exchange from the first heat pipe to the second heat pipe, wherein the heat exchange includes heat drawn away from the heat source.

2. The system of claim 1, wherein the heat source is coupled to the first closed end of the first heat pipe.

3. The system of claim 1, wherein the heat exchange from the first heat pipe to the second heat pipe is configured to externally heat the second working fluid in the second heat pipe.

4. The system of claim 3, wherein the heat exchange is further configured to cause a phase change of the second working fluid in the second heat pipe.

5. The system of claim 1, further comprising heat exchange material attached to the first heat pipe and the second heat pipe, the heat exchange material being configured to transfer heat from the first heat pipe to the second heat pipe.

6. The system of claim 1, wherein each heat pipe of the plurality of heat pipes is curve shaped.

7. The system of claim 6, wherein the first and second closed ends of the first heat pipe are arranged towards the second heat pipe.

8. The system of claim 7, wherein the first and second closed ends of the first heat pipe are configured to transmit heat to the second heat pipe.

9. The system of claim 1, further comprising a fin portion being arranged in thermal communication with the plurality of heat pipes, the fin portion is configured to displace heat emanating from the plurality of heat pipes.

10. The system of claim 1, wherein:
 the heat source is coupled to the second closed end of the first heat pipe;
 the second heat pipe includes a first closed end and a second closed end; and
 the first closed end of the first heat pipe is positioned the predetermined distance from the first closed end of the second heat pipe.

11. A thermal control apparatus having a plurality of heat pipes, comprising:
 a first heat pipe from the plurality of heat pipes having a first closed end and a second closed end and containing a first working fluid enclosed within the first heat pipe;
 a heat source in thermal communication with the first heat pipe, the heat source being configured to externally heat the first working fluid within the first heat pipe; and
 a second heat pipe from the plurality of heat pipes containing a second working fluid enclosed within the second heat pipe and at least a portion of the second heat pipe is positioned a predetermined distance from a section of the first heat pipe, the predetermined distance is configured to allow for a heat exchange from the first heat pipe to the second heat pipe, wherein the heat exchange includes heat drawn away from the heat source.

12. The thermal control apparatus of claim 11, wherein the heat source is coupled to the first closed end of the first heat pipe.

13. The thermal control apparatus of claim 11, wherein the heat exchange from the first heat pipe to the second heat pipe is configured to externally heat the second working fluid in the second heat pipe.

14. The thermal control apparatus of claim 13, wherein the heat exchange is further configured to cause a phase change of the second working fluid in the second heat pipe.

15. The thermal control apparatus of claim 11, further comprising heat exchange material attached to the first heat pipe and the second heat pipe, the heat exchange material being configured to transfer heat from the first heat pipe to the second heat pipe.

16. The thermal control apparatus of claim 11, wherein each heat pipe of the plurality of heat pipes is curve shaped.

17. The thermal control apparatus of claim 16, wherein the first and second closed ends of the first heat pipe are arranged towards the second heat pipe.

18. The thermal control apparatus of claim 17, wherein the first and second closed ends of the first heat pipe are configured to transmit heat to the second heat pipe.

19. The thermal control apparatus of claim 11, further comprising a fin portion being arranged in thermal communication with the plurality of heat pipes, the fin portion is configured to displace heat emanating from the plurality of heat pipes.

20. The thermal control apparatus of claim 11, wherein:
 the heat source is coupled to the second closed end of the first heat pipe;
 the second heat pipe includes a first closed end and a second closed end; and
 the first closed end of the first heat pipe is positioned the predetermined distance from the first closed end of the second heat pipe.

* * * * *